United States Patent [19]

Schoening et al.

[11] 4,442,066

[45] Apr. 10, 1984

[54] SUPPORTING FLOOR FOR THE CORE OF A NUCLEAR REACTOR

[75] Inventors: Josef Schoening, Hambruecken; Hans-Georg Schwiers, Ketsch; Claus Elter, Bad Durkheim; Rolf Fritz, Oftersheim; Karl-Friedrich Kissel, Laudenbach, all of Fed. Rep. of Germany

[73] Assignee: Hochtemperatur-Reaktorbau GmbH, Cologne, Fed. Rep. of Germany

[21] Appl. No.: 169,282

[22] Filed: Jul. 16, 1980

[30] Foreign Application Priority Data

Jul. 23, 1979 [DE] Fed. Rep. of Germany ....... 2929741

[51] Int. Cl.³ ............................................. G21C 11/00
[52] U.S. Cl. .................................. 376/302; 376/304; 376/381; 376/461
[58] Field of Search ............... 376/362, 381, 427, 461, 376/458, 459, 302–304

[56] References Cited

U.S. PATENT DOCUMENTS

| 3,100,188 | 8/1963 | Fraas et al. ..................... 376/459 X |
| 3,174,906 | 3/1965 | Rouge ............................. 376/458 X |
| 3,342,693 | 9/1967 | Triggs .............................. 376/459 |
| 4,073,685 | 2/1978 | Brown et al. ...................... 376/302 |
| 4,086,133 | 4/1978 | Anderson ......................... 376/458 X |
| 4,121,973 | 10/1978 | Mysels et al. ..................... 376/458 X |
| 4,189,347 | 2/1980 | Reutler et al. .................... 376/381 |
| 4,199,405 | 4/1980 | Schweiger ......................... 376/458 |
| 4,234,384 | 11/1980 | Fritz et al. ....................... 376/381 X |
| 4,257,845 | 3/1981 | Lukaszewicz et al. ......... 376/381 X |
| 4,302,293 | 11/1981 | Elter et al. ....................... 376/381 |

Primary Examiner—Peter A. Nelson
Attorney, Agent, or Firm—Schwartz, Jeffery, Schwaab, Mack, Blumenthal & Koch

[57] ABSTRACT

A supporting floor for the core of a nuclear reactor utilizes a plurality of independent support columns forming the floor of the reactor and resting on the bottom layers of the reactor. The support columns are surrounded by a side reflector which is in turn surrounded by a thermal side shield. Between the thermal side shield and the side reflector are disposed retaining means for maintaining the columns close together and preventing the formation of large gaps during operation.

12 Claims, 4 Drawing Figures

SUPPORTING FLOOR FOR THE CORE OF A NUCLEAR REACTOR

BACKGROUND OF THE INVENTION

1. Field of the Invention

The invention concerns a supporting floor for the core of a nuclear reactor. More particularly, the supporting floor comprises a plurality of graphite blocks arranged in vertical columns. The nuclear reactor, preferably a gas cooled nuclear reactor, comprises a reactor core in the form of a pile of spherical fuel elements surrounded by a cylindrical side reflector and a thermal side shield arranged at a distance from the side reflector. The vertical columns of the supporting floor are provided with bores in the longitudinal direction and rest on the base of the nuclear reactor itself.

2. Background of the Prior Art

West German Offenlegungsschrift No. 1 956 226 discloses a gas cooled nuclear reactor having a core of graphite blocks arranged in vertical columns. The core is supported on the floor of the reactor pressure vessel by means of several layers of a refractory material, for example, graphite. Each column of the core is supported by its own supporting column. The supporting columns consist of several graphite blocks stacked on top of each other. Access for the cooling gas to the core is provided by means of channels formed into the graphite blocks of the support layers and connected with gas conduits in the core and with a gas space outside the core. The entire structure of supporting columns is surrounded by packing blocks arranged between the structure and the lining of the pressure vessel.

West German Published Application No. 1 261 606 shows a nuclear reactor with a radiation reflector inserted between the thermal shield and the core of the reactor. The reflector consists of a lateral reflector enclosing a cylindrical cavity and a lower reflector serving as the supporting floor. The lower reflector is formed by two layers of ashlar shaped graphite blocks differing in their longitudinal direction from one layer to the other. In each of the layers the blocks arranged around a central opening are maintained together and locked against each other by means of wedges. The lateral reflector, which consists of graphite blocks stacked in layers, one upon the other, is supported by the thermal side shield. A plurality of elastic structural parts acting in the radial direction provides this support.

The prior art further includes a supporting floor for a pebble bed reactor consisting of a gas permeable supporting layer of spheres of high temperature resistant material and a support structure designed for the weight of the supporting pebble bed layer and the fuel elements. The fuel elements are piled directly onto the supporting pebble layer. A layer of high temperature resistant tiles is arranged between the support structure and the supporting pebble layer.

In another pebble bed reactor, the THTR-300 MWe, the support floor for the pile of fuel pellets comprises a plurality of hexagonal graphite blocks arranged in freely movable columns and containing axial bores for the cooling gas. Each column formed by the graphite blocks is supported individually by a circular column. The circular column is built into a floor of graphite plates. The expansion gaps obtained by a reduction of the nominal dimensions of the graphite blocks permit the unimpaired thermal expansion of the elements of the support floor without exceeding the overall dimensions. Under certain non-stationary operating conditions, or in the case of failures, respectively, these gaps may add up and relatively large individual gaps may be formed. However, in view of the dimensions of the THTR-300 MWe, the restoring forces required to close the gaps are of negligible importance.

A supporting structure for a pebble bed reactor of greater capacity is known from West German Offenlegungsschrift No. 27 18 493. This support structure consists of several layers of prismatic graphite blocks arranged over each other and built up as a closed unit without expansion gaps. The blocks of one layer are keyed into the blocks of the adjacent layer. The preferred hexagonal graphite blocks display widths across their flats in the upper layers that are different from those in the bottom layer, which is formed of a plurality of supporting units. Each supporting unit is resting in its central area of a circular column and is composed of a number of carrier segments. The support structure represents a stable and rigid plate. Because of the keying of the prismatic blocks, no restoring force is required. However, in the case of this known structure, certain specific measures must be taken to counter the deformations occurring in the bottom layers of the nuclear reactor or in the bottom of the pressure vessel, respectively.

SUMMARY OF THE INVENTION

The present invention is an improvement of the abovedescribed state of the art and is directed specifically to providing a support floor for a nuclear reactor having spherical fuel elements. The structure of the present invention avoids the reactive forces and the excessive thermal stresses often found in the known reactors and generated as the result of the existance of radial temperature profiles. Adjustments without strain to the deformations of the bottom of the pressure vessel are also possible in the structure of this type.

These and other objects are attained according to the invention by placing the vertical columns as independent individual columns, directly adjacent to each other, without expansion gaps and by maintaining the columns together in the horizontal direction by means for retaining the columns in their original relative horizontal position. This means is arranged in the annular space between the lower part of the side reflector and the thermal side shield. The means is preferably a plurality of restoring elements such as spring supports or support struts.

The supporting floor arrangement of the invention performs all of the functions required of it. For example, it transmits the vertical forces of the pile of fuel elements downward, it passes the horizontal forces by way of restoring elements to the thermal side shield, it also performs the task of shielding and of conducting the hot gas from the reactor core to the hot gas collector space.

Because the supporting floor has been resolved into a plurality of independent, individual columns, the differential thermal expansions of the columns are not restricted. Stationary and non-stationary temperature fields, therefore, do not lead to the generation of reactive forces or substantial thermal stresses. The support floor is not sensitive relative to manufacturing and assembly tolerances and adapts without strain to the deformations of the bottom of the pressure vessel.

Vibrations of the individual columns of the support floor are practically excluded, because the support floor of a pebble bed reactor customarily has an inclined surface (for the removal of the spherical fuel elements at least one pebble outlet tube must be provided with a conical tube inlet located within the support floor) and the columns are maintained together by means of elements that retain, restore or reset the columns under stress.

The vertical columns of the support floor according to the invention preferably have a hexagonal cross section. The columns are placed adjacent to each other so that they are generally in contact with each other. (Of course some gaps due to manufacturing conditions are possible and tolerable).

Advantageously, an additional circular column may be provided for each hexagonal column. The circular column rests on the bottom layers of the nuclear reactor while the hexagonal column rests on the circular column. The circular columns conveniently have diameters smaller than the width of the bottom surface of the hexagonal columns. The free space created in this manner around the circular columns forms a hot gas collector space of the nuclear reactor. The circular columns acting as linked supports for the hexagonal columns, may be built into the bottom layers of the nuclear reactor.

In high capacity nuclear reactors having large reactor cores, the retaining means is comprised of a plurality of restoring elements. These are advantageously designed in the form of spring supports. By such means, the vertical columns are maintained together in the radial direction so that no gaps or only acceptably small gaps, exist between the vertical columns. Preferably, the spring supports are arranged so that the gaps appearing between the vertical columns after extended operating periods or following a non-stationary operation are limited to a predetermined maximum size. In the process, the horizontal forces of the pile of fuel elements must be safely transferred to the thermal side shield. At the same time, the differential thermal expansions of the support floor and the thermal side shield must also be possible.

In nuclear reactors with lesser capacities, support struts may be used as the restoring elements; they must be arranged with clearance between the support floor and the thermal side shield. The differential radial thermal expansions of the support floor and the thermal shield are taken into account by that the maximally possible differential thermal expansion of the above-mentioned two structural parts are set at the support struts as clearances.

When the support floor according to the invention is used in nuclear reactors having their reactivities affected by means of absorber balls with substantially smaller diameters than those of the spherical fuel elements, spring supports are utilized (independently of the size of the core structure) as the restoring elements. The restoring force is designed so that the dimensions of the gaps being formed between the vertical columns remains smaller than the diameter of the absorber balls, even toward the end of the operation of the nuclear reactor.

Gaps are created not only by the temperature load during an extended operating period, but occur also under certain operating conditions. Thus, gaps are dependent on the operation and temperature conditions. The restoring forces of the spring supports have the function of suppressing the gaps between the vertical columns or at least to limit their size, in order to prevent the penetration of the absorber balls into any gaps that form and thus causing the straining of the assembly.

It may be appropriate to provide a number of gaps in the side reflector. This will prevent the side reflector from becoming unable to transmit forces to the support floor due to a pressure ring support effect, under certain conditions.

According to an advantageous further embodiment of the invention, the bores for the cooling gas in the vertical columns are provided in relation to number, diameter and distance so that in the individual vertical columns either none or only very slight non-stationary thermal stresses are generated. Numerous individual bores may be arranged to pass through each vertical column in the longitudinal direction such that the temperatures prevailing in the support floor arrangement adapt uniformly to temperature transients, whenever such occurs.

BRIEF DESCRIPTION OF THE DRAWINGS

In the drawings, two support floors for a pebble bed reactor are schematically represented as examples of certain embodiments of the invention.

In the Drawings.

DETAILED DESCRIPTION OF EMBODIMENTS

Figure 1:
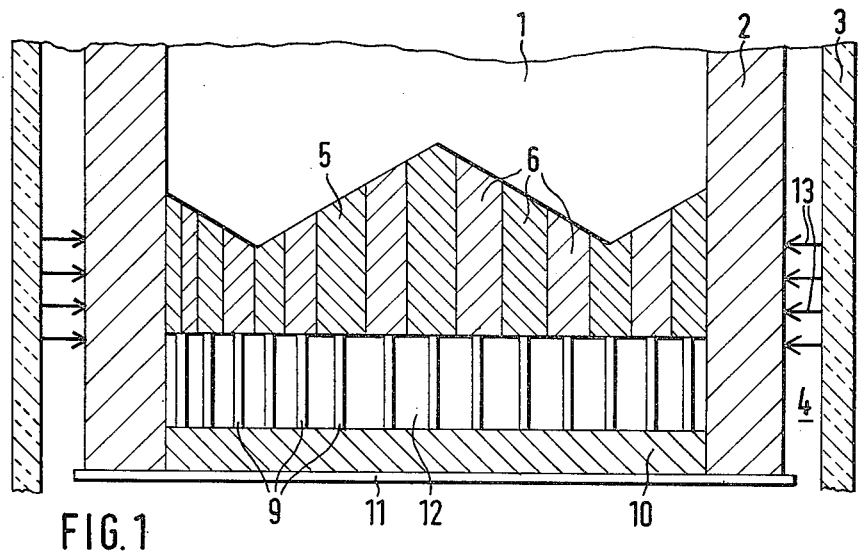
FIG. 1 shows a vertical section through the general structure of a support floor of the present invention.
Figure 3:
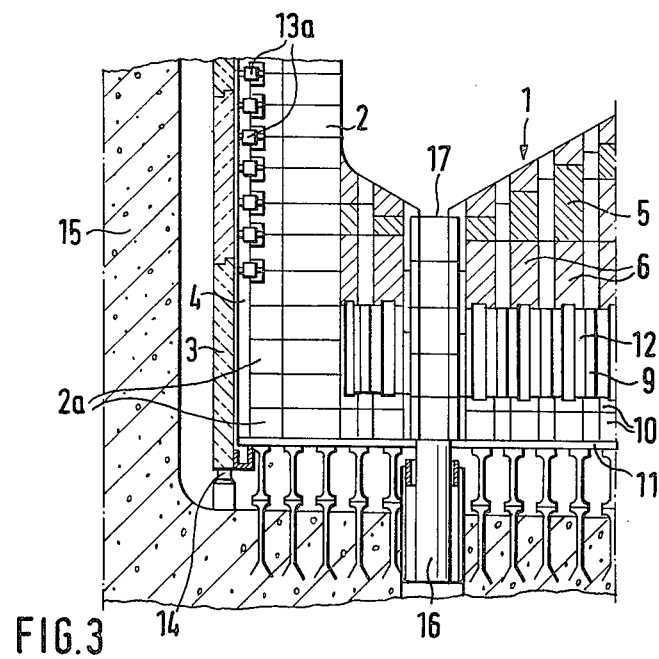
FIG. 3 shows in detail a vertical cross section through the support floor of an embodiment of the invention.

FIG. 1 shows the core 1 of a gas cooled high temperature reactor formed by a pile of spherical fuel elements, surrounded by an annular side reflector 2. The side reflector is surrounded in turn by a thermal side shield 3, wherein an annular space 4 is provided between the two structural parts. Several pebble removal tubes (one such tube 16 is shown in FIG. 3) exit through the bottom of the pebble bed. Depending on the size of the nuclear reactor installation, the number of pebble removal tubes may vary between 1 and 7. A conical pebble inlet 17 shown in FIG. 3 is provided for each pebble removal tube, which is formed by a part of the support floor.

Figure 2:
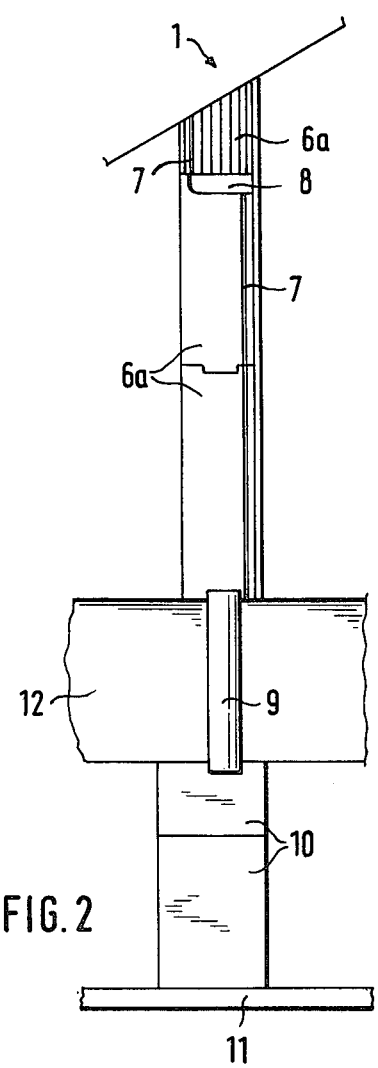
FIG. 2 represents an individual column of the support floor of FIG. 1.

The portion of the support floor arrangement of the invention shown in FIG. 2 consists of a plurality of graphite blocks 6a, arranged in vertical columns 6. The vertical columns 6 have hexagonal cross sections shown in FIG. 4 and are equipped with numerous bores 7 extending in the longitudinal direction through which the cooling gas heated in the core 1 may exit from the core.

The structure shown in FIG. 2 illustrates a single column 6 with cooling gas bores 7. The cooling gas bores 7 are established with respect to number, diameter and distance so that no or only slight non-stationary thermal stresses may be generated in the individual vertical columns. The graphite blocks 6a located at different heights or in different layers may have different configurations with respect to the cooling gas bores 7. In the embodiments shown herein, the uppermost layer of the graphite blocks 6a has a greater number of cooling gas bores 7 than the other layers and a small gas collector space 8 is located at the upper end of the second layer from the top. This space is interconnected with the cooling gas bores in the uppermost and the second layer from the top.

The vertical columns 6 of the support floor 5 may be constructed of hexagonal graphite blocks having different widths across the flats in the individual layers.

As shown in FIGS. 1 and 2, each vertical column 6 resting on a circular column 9 is in turn supported on the bottom layers 10 of the high temperature reactor. The bottom layers 10 are supported by a floor plate 11. The diameter of the circular columns 9 is smaller than the flat width or end surface of the vertical columns 6. The free space between the circular columns 9 forms the hot gas collector space 12 of the high temperature reactor and is, therefore, interconnected with the cooling gas bores 7 in the graphite blocks 6a in such a manner that the gas freely flows therebetween.

Because the vertical columns 6 are placed adjacent to each other as independent single columns without expansion gaps, the support floor arrangement 5 as a whole is not sensitive to thermal stresses and is capable of adjusting without strain to deformations of the bottom layers 10 and the floor plate 11. In order to keep the size of the gaps between the columns within the design parameters under all manufacturing, operational and thermal conditions, retaining means 13 acting inwardly in the radial direction are arranged in the annular space 4 as indicated in FIG. 1 by arrows. The type and layout of the retaining means 13 is determined by the reactor capacity and the core dimensions of the high temperature reactor.

In FIG. 3, a support floor 5 for a high temperature reactor of small or intermediate capacity is shown. Identical structural elements are designated by the same reference symbols as in FIGS. 1 and 2. FIG. 3 shows that the side reflector consists of a plurality of stacked graphite blocks 2a and rests by means of roller bearings on the bottom of the reinforced concrete pressure vessel 15 surrounding the high temperature reactor. The restoring elements arranged between the thermal side shield 3 and the side reflector 2 consist of supporting struts 13a, provided with a clearance corresponding to the maximum possible differential radial thermal expansion of the support floor 5 and the thermal side shield 3. In the event that the reactor is designed to utilize absorber balls for the shutdown of the high temperature reactor, the restoring elements consist of spring supports in order to suppress or limit the gaps with respect to size.

The reactor core 1 has several pebble outlet tubes 16 passing through the support floor 5, each of them being provided with a conical pebble inlet 17. The surface of the support floor 5 is designed so as to form the said conical pebble inlets.

Figure 4:
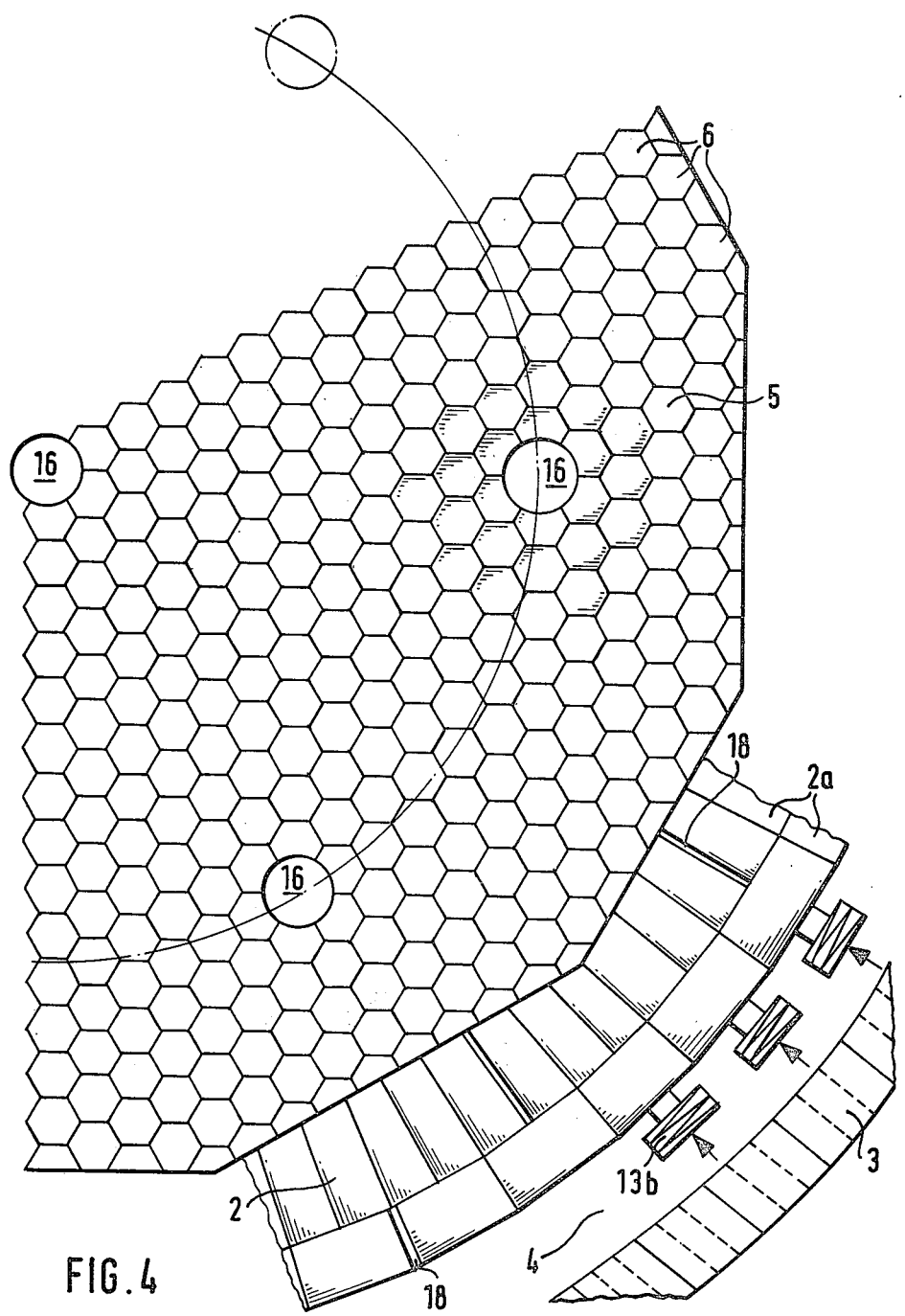
FIG. 4 represents a top view of the support floor of another embodiment of the invention.

FIG. 4 exhibits another embodiment of the support floor 5 according to the invention, intended for a high capacity, high temperature reactor. A total of seven pebble outlet tubes 16 are provided under the reactor core 1, four of which are shown in the drawing. Toward the side reflector 2, the graphite blocks 6a of the vertical columns 6 have a different configuration in cross section. The shape of the cross sections are varied so that each individual graphite block 6a is radially restrained. FIG. 4 demonstrates the arrangement of the vertical columns 6 directly adjacent to each other.

As the restoring elements for this support floor, spring supports 13b are provided; they are arranged in the annular space 4 and hold the vertical columns 6 together in the radial direction. In order to prevent the development of a pressure ring support effect in the side reflector 2, the latter is provided with a series of gaps 18 between the individual graphite blocks 2a. The spring supports 13b are laid out that the gaps developing after an extended period of operation of the high temperature reactor between the vertical column 6, remain under a predetermined maximum size. If in the high temperature reactor absorber balls having diameters substantially smaller than those of the fuel elements are used to affect the reactivity of the reactor, the predetermined maximum size of the gaps is also given by the diameter of the absorber balls.

We claim:

1. A support floor for the core of a high temperature pebble bed nuclear reactor comprising:
   a plurality of support columns placed directly adjacent one another forming the reactor core floor;
   a bed of spherical fuel elements forming the reactor core;
   a cylindrical side reflector surrounding said columns and the reactor core;
   a thermal side shield arranged at a distance around said cylindrical side reflector to form an annular space; and
   means for retaining said support columns in their respective horizontal positions said means disposed in said annular space between the lower part of the side reflector and the thermal side shields to substantially prevent the formation of expansion gaps between said columns.

2. The support floor of claim 1, wherein said support columns have a hexagonal cross section.

3. The support floor of claim 2, wherein each of said support columns rests upon a circular column having a diameter smaller than the bottom surface of said support column and wherein said circular columns rest upon the layered floor of the nuclear reactor.

4. The support floor of claim 1, wherein the nuclear reactor is a high capacity reactor and said retaining means comprise a plurality of spring supports.

5. The support floor of claim 4, wherein said spring supports are arranged so that the gaps developing after an extended operating period of the nuclear reactor between the support columns remain under a predetermined maximum size.

6. The support floor of claim 1, wherein the nuclear reactor is a low capacity reactor and said retaining means comprise a plurality of supporting struts.

7. The support floor of claim 6, wherein the maximum possible differential radial thermal expansion of the support floor and said thermal side shield are arranged to define the clearance on said support struts.

8. The support floor of claim 1, wherein said retaining means comprise a plurality of spring supports as restoring elements, and wherein the restoring force of said spring supports is dimensioned so that the size of the gaps developing between said support columns remains smaller than the diameter of absorber balls added to the core of the reactor.

9. The support floor of claim 1, wherein said side reflector has a plurality of radial gaps.

10. The support floor of claim 3, further comprising a plurality of cooling gas bores arranged in said supporting columns.

11. The support floor of claim 10, wherein said cooling gas bores are in open communication with said core at one end and with a gas collecting space at the other end.

12. The support floor of claim 11, wherein said gas collecting space is defined by said circular columns the overlapping lower ends of said support columns and said reactor floor.

* * * * *